(12) United States Patent
Bhaskaran et al.

(10) Patent No.: US 6,732,364 B1
(45) Date of Patent: May 4, 2004

(54) MECHANISM FOR DEVELOPING AND DYNAMICALLY DEPLOYING AWARELETS

(75) Inventors: Kumar Bhaskaran, Englewood Cliffs, NJ (US); Girish B. Chafle, New Delhi (IN); Fenno F. Heath, III, Trumbull, CT (US)

(73) Assignee: International Business Machines Corporation, Armonk, NY (US)

( * ) Notice: Subject to any disclaimer, the term of this patent is extended or adjusted under 35 U.S.C. 154(b) by 685 days.

(21) Appl. No.: 09/616,893

(22) Filed: Jul. 14, 2000

(51) Int. Cl.⁷ ................................................ G06F 9/46
(52) U.S. Cl. ..................... 719/318; 709/203; 709/204
(58) Field of Search ..................... 709/204, 311–318, 709/328, 203; 717/101, 106, 121

(56) References Cited

U.S. PATENT DOCUMENTS

2002/0010803 A1 * 1/2002 Oberstein et al. ........... 709/318

* cited by examiner

Primary Examiner—Meng-Al T. An
Assistant Examiner—Charles Anya
(74) Attorney, Agent, or Firm—Whitham, Curtis & Christofferson, P.C.; Stephen C. Kaufman

(57) ABSTRACT

A software framework provides building blocks for developing event handlers (typically XML-based or data object based) and a mechanism for dynamically deploying and managing them within an online community having roles and places defined for users and groups. The complex data to be sent/received among users and applications can be described in XML or actual Java™ objects. The software framework is composed of the following principal components: Awarelet base, Awarelet Container, Awarelet Application Adapter, Awarelet Event, Awarelet Configuration, and Awarelet Repository. Awarelet Technology is designed to enhanced the prior art of Instant Messaging in order to facilitate more robust interactions between members of the online community. This invention considers not only users as members, but in addition, business applications and processes as well. The present invention aims to solve the problems stemming from lack of support for business related collaborations in the prior art, as well as enhance the ability to send and receive complex informational events. This Awarelet Technology allows for the creation of real-time business related collaborations in order for the members of an online community to exchange business events and context. Awarelet Technology brings the notion of context and structure to the members of online communities and can be used to construct powerful real-time business related collaborations.

12 Claims, 7 Drawing Sheets

MECHANISM FOR DEVELOPING AND DYNAMICALLY DEPLOYING AWARELETS

BACKGROUND OF THE INVENTION

1. Field of the Invention

The present invention generally relates to real-time collaboration and, more particularly, to handling events which can be either XML (eXtensible Markup Language) based or data object based, using "Awarelets" that are either visual or non-visual event handlers. The invention provides a mechanism, realized in software, for building and deploying Awarelets.

2. Background Description

Many e-business and e-commerce solutions seek real-time collaboration capabilities to support on-line communities and collaborative business processes. The real-time collaboration in such solutions must be manifested through an awareness of the "point-of-presence" (client side) of the participants and the ability to channel services of interest to the participants.

When a user is considered to be "online", that end user has a client application which represents the end user's point of presence connection to an online community server, or awareness server (server side) which manages a community of users. The end user interacts with other end users, typically by sending and receiving simple text messages in real time, via the point of presence connection to the server.

A common scenario today is where users are connected to the Internet via Web browsers. In this scenario, the user must "pull" (request) the information; sites cannot "push" (send unsolicited) information. There are exceptions to this, such as instant messaging, but most involve an explicit agreement by the user to accept unsolicited data.

The ability to pass data between users in a community without explicitly requesting each piece of data is part of the concept of real-time collaboration. More broadly, collaboration is the real time sharing of information among a set of users who define a community. There is a large amount of software that currently provides collaboration in one form or another. The following set of examples is by no means inclusive or particularly representative; they merely demonstrate some of the currently available products.

Instant Messaging infrastructures like those provided by America Online (AOL), Lotus® Sametime, ICQ, Microsoft® MSN Messenger and others are the prior art targeted for improvement by this invention. The prior art typically provides instant messaging and primarily allows for simple real-time adhoc collaborations within an online community by passing simple text messages between the users. In addition, Instant Messaging infrastructures, as provided by AOL, provide for a notion of user groups, sometimes called buddy lists, which are users that a user typically interacts with. In essence, AOL Instant Messenger provides the capability of generating ad hoc private chat rooms. These simple groupings are managed by the user, and are not really part of the underlying system.

Traditionally, business driven collaborations involve more complex interactions and the exchange of more complex messages between multiple role players, as well as business applications and processes. The lack of ability to pass complex messages, in the prior art, between the users limits the potential of creating more complex interactions or collaborations between the users. The prior art typically does not address such complex collaborations, primarily due to three fundamental factors. First of all, the simple text messages passed between users are not sophisticated enough to allow for complex message processing. Second, the notion of buddies and groups does not support a more powerful notion of role players. Third, the members of the online community in the prior art consist of end users only, and applications or processes are not engaged during these simple adhoc collaborations.

The systems of the prior art only allow end users to interact with each other by sending and receiving simple text messages in a chat room-like environment. Sometimes there is a mechanism to allow end users to share applications and transfer files as well, but application sharing and file transfer are not addressed in this disclosure.

SUMMARY OF THE INVENTION

It is therefore an object of the invention to solve the real-time collaboration problem through "Awarelets" that are either visual or non-visual event handlers. Events can be XML (eXtensible Markup Language) based or data object based. The invention provides a mechanism, realized in software, for building and deploying Awarelets. Solution and application developers will be able to customize and integrate Awarelets to realize real-time collaborative solutions using an open standard such as XML to define the real-time events of interest.

It is another object of this invention to provide a framework to handle more complex types of data exchange that are handled by the Awarelets, as described below. The present invention enhances the notion of exchanging messages by allowing more complex messages to be sent and received by end users and applications.

Awarelet Technology is designed to enhance the prior art of Instant Messaging in order to facilitate more robust interactions between members of the online community. The members of the online community are typically just end users in the prior art; however, this invention considers not only users as members, but in addition, business applications and processes as well.

The present invention aims to solve the problems stemming from lack of support for business related collaborations in the prior art. Awarelet Technology allows for the creation of real-time business related collaborations in order for the members of an online community to exchange business events and context. Awarelet Technology brings the notion of context and structure to the members of online communities and can be used to construct powerful real-time business related collaborations.

Awarelet Technology leverages the prior art by reusing the communication infrastructure provided by the prior art. Awarelet Technology extends the prior art in order to facilitate more robust collaborations between the members of the online community by allowing complex data objects or XML based events to be exchanged, processed, and rendered within the online community.

According to the invention, a software framework provides building blocks for developing XML-based or data object based event handlers and a mechanism for dynamically deploying and managing them. The complex data to be sent/received among users and applications can be described in XML or actual Java objects. It should be understood that while the description below primarily discusses XML based events, these can always be replaced by data object based events. One skilled in the art would understand how to represent this complex data in other formats, as they become available with new languages and technologies. The software framework is composed of the following principal components:

Awarelet Base,
Awarelet Container,
Awarelet Application Adapter,
Awarelet Event,
Awarelet Configuration, and
Awarelet Repository.

This rich collaboration potential between members of an online community can be realized by developers who will use this general purpose framework to derive Awarelets from the Awarelet Base, which will ultimately be manifesting the behavior of the desired collaboration. A developer will design and implement Awarelets at build time, and then deploy and configure the Awarelets into a runtime instantiation of one of the prior art awareness engines like, AOL instant messaging, Lotus® Sametime, Microsoft® MSN Messenger, ICQ, etc. Since a framework will be in place to support the building and deployment of Awarelets, developers of new Awarelets should be able to easily build and deploy these new Awarelets.

A framework provided by this invention allows Awarelets, i.e., message/event handlers for point of presence awareness applications, to be developed. The Awarelets subscribe to specific events, e.g., Awarelet events, process and perhaps render the complex event type to the end user. The end user can also interact with the rendered event and resolve the event depending on the customized event handling designed into the Awarelet, residing in an Awarelet Container, by the Awarelet developer. Further, the Awarelets developed and added to an Awarelet Repository can be configured to be dynamically deployed to members of the online community, based on user, role or place. This allows the distribution of Awarelets to members of the community to be driven by a centralized management scheme via the Awarelet Repository and Awarelet Configuration.

In the preferred embodiment, the Awarelet Container uses the Java™ InfoBus as an information bus. The InfoBus provides the ability to pass information among objects without the objects having direct communication with one another. Information is placed on or removed from the InfoBus without the accessing object necessarily knowing where the information came from. This is attractive since all objects need only know one central object rather than requiring a complex communications network.

The Awarelet Application Adapter is the base class for bi-directional mediation between the underlying communication mechanisms and the derived Awarelets. The developer derives a customized derived Awarelet Application Adapter to act as mediator for a specific collaboration infrastructure as an instantiation of the mediation means. The mediator, e.g., derived Awarelet Application Adapter, extracts events from the communication mechanism and delivers the events to derived Awarelets via the Awarelet Container. The derived Awarelets process the events in a desired manner based on the designed behavior of the derived Awarelet.

BRIEF DESCRIPTION OF THE DRAWINGS

The foregoing and other objects, aspects and advantages will be better understood from the following detailed description of a preferred embodiment of the invention with reference to the drawings, in which:

FIG. 4A shows the mechanism for loading of Awarelets; FIGS. 4B and 4C together show the bi-directional event flow between a derived Awarelet and the derived Awarelet Application Adapter; FIG. 4B shows the flow of an Awarelet event from the derived Awarelet Application Adapter to the derived Awarelet; and FIG. 4C shows the flow of an Awarelet event from the derived Awarelet to the derived Awarelet Application Adapter.

DETAILED DESCRIPTION OF A PREFERRED EMBODIMENT OF THE INVENTION

Figure 1:
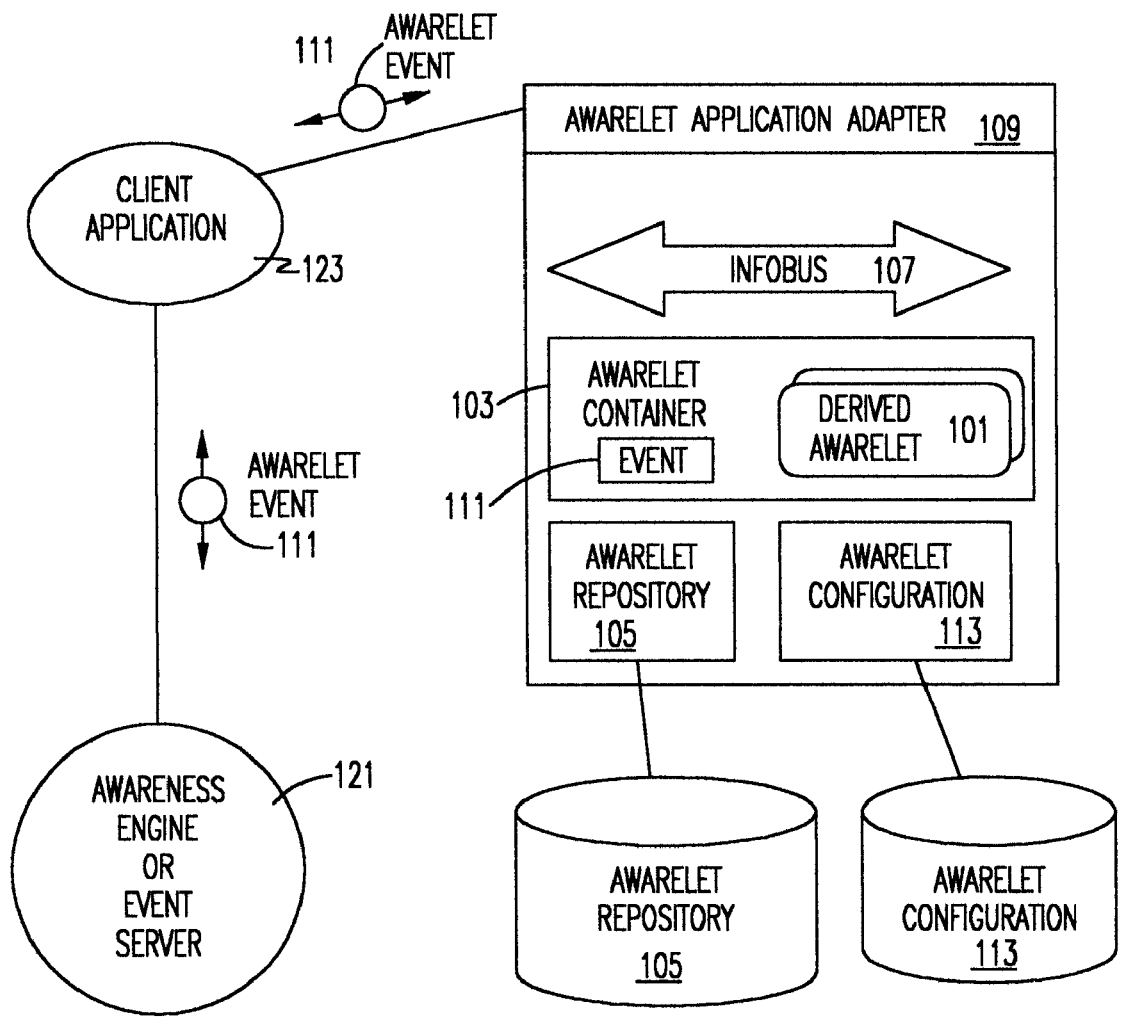
FIG. 1 illustrates a high level Awarelet conceptual architecture, according to the preferred embodiment of the invention.

The preferred embodiment of the present invention is implemented in an object-oriented language. Object-Oriented Designs must be described from several viewpoints. This multiplicity is necessary to understand the various aspects of the design. The architecture for implementing the design is presented to give context.

A service of interest to be used with the present invention might be for a developer to create an auctioning Awarelet, or event handler, by deriving from the Awarelet base class within the framework. Based on the behavior of the derived Awarelet, it can allow members of the online community to assume certain roles within the auction. All members of the online community that enter into the auction will be dynamically delivered the auctioning Awarelet and immediately start participating in the auction. This auctioning Awarelet would coordinate a real-time auction between and among all of the role players, allowing for real-time interaction between and among the members. These interactions could be actions such as: initiating the auction, bringing a new item to the auction, bidding on an item, and closing the auction. Service of Interests can be realized by the design and implementation of a derived Awarelet, which will process subscribed events.

Another example of a service of interest might be as follows. A plant floor has a machine which is spewing out statistical events of the machine's performance. These statistical events are published into the online community. Various users of the online community are delivered a Machine Performance Awarelet, based on the Awarelet's configuration, to view the statistical events. Only the users with subscription interest in the statistical events would receive and process the statistical events in the Machine Performance Awarelet which was previously delivered to the user. It would be apparent to one skilled in the art that the Awarelet framework could be used with a variety of online communities and point-of-presence applications and is not limited to the examples described herein.

The preferred embodiment of the present invention is a computer implemented framework for building Awarelets for an application. The framework includes a base class Awarelet which includes generic methods which are necessary for implementation of the desired Awarelet customized for a specific application, such as the Auction Awarelet, or Machine Performance Awarelet as described above. A customized Awarelet is derived from the base class Awarelet and will be described below as a "derived" Awarelet to distinguish from the generic base class. The derived Awarelet inherits the basic methods from the base Awarelet, for instance methods of communication, etc. A developer will build upon the Awarelet framework in order to customize derived Awarelets for handling any variety of events, dependent on the type of target application to be used in the online community. Further, the Awarelet framework can be customized to interoperate with an existing online community, such as Lotus® Sametime, or be customized for use with a proprietary collaboration community.

Referring now to the drawings, and more particularly to FIG. 1, the Awarelet architecture is shown. A derived Awarelet 101 is a visual or non-visual user customized event handler. Derived Awarelets are contained within an Awarelet Container 103, and can be used in any application that needs to process events. An example of where Awarelets can be useful is in on-line role based communities. Awarelets can enable users and applications in on-line role based-communities to communicate asynchronously with each other by sending and receiving Awarelet Events 111. "Asynchronous" means they can respond to events that happen outside of the normal flow of the program, such as user input. Awarelets process the received events and during processing can render the event visually.

The Awarelet Container 103 acts as a host for the derived Awarelets 101. It dynamically loads various derived Awarelets based on the configuration information from an Awarelet Repository 105. An Awarelet Container 103 shields the individual derived Awarelets from the underlying communication mechanism by pushing and pulling Awarelet events from an information bus 107, which in the preferred embodiment is a Java™-based event service, InfoBus, for publishing and subscribing to events locally within a Java™ Virtual Machine. An Awarelet Container 103 will integrate with an Awarelet Application Adapter 109 that receives and sends Awarelet Events 111 over some underlying communication mechanism. This communication mechanism may vary and is transparent to the derived Awarelet. The communication mechanisms are programmed as methods in the parent, or base Awarelet (not shown) and inherited by the derived Awarelets 101. The Awarelet Application Adapter 109 serves as the bridge between the Awarelet Container 103 and the underlying communication mechanism so that derived Awarelets 101, which are contained by the Awarelet Container 103, can be written to focus just on the event handling and not be burdened with the communication details.

An application developer uses an Awarelet Application Adapter 109 to integrate his/her application with the Awarelet Container 103. The Awarelet Application Adapter 109 is primarily responsible for serving as a bi-directional communication bridge, which will allow derived Awarelets 101 to receive and send events. Typically an application will integrate with an Awarelet Application Adapter 109 in order to send and receive events to and from an Awarelet Container 103.

An Awarelet Event 111 encapsulates the context for communication. In the preferred embodiment, it is typically composed using XML and consists of the message type and a message body.

The Awarelet Configuration 113 provides configuration data for the derived Awarelets 101 in terms of User, Role and Place. The Awarelet Configuration Servlet (shown at 317 in FIG. 3) is used by the derived Awarelet Configuration in order to retrieve the necessary configuration data. Typically, Users, Roles, and Places will have various derived Awarelets 101 assigned to them. A place is typically a "virtual" or "abstract" place like an online chat room or other place "in cyberspace" where some activity takes place among users. The behavior of the place is defined by the configuration of the place in its corresponding derived Awarelet. It is up to an Application Developer to determine the configuration during build time, and also instruct the Awarelet Container to load various Awarelets during runtime. In addition, subscriptions to events are configured by associating Users, Roles, and Places, with subscription masks.

An Awarelet Repository 105 provides storage for the derived Awarelets 101 and dynamically loads the derived Awarelets 101 based on the Awarelet Configuration 113.

The Awarelet Technology of the preferred embodiment can be integrated with different communication mechanisms to provide the communication, coordination, and collaboration in on-line role based-Communities and Processes. A variety of Awareness engines or event servers 121 can be integrated with the Awarelet technology. This technology can also be easily integrated with an existing user/client application 123 to enhance the functionality by providing the support for collaboration.

Figure 2:
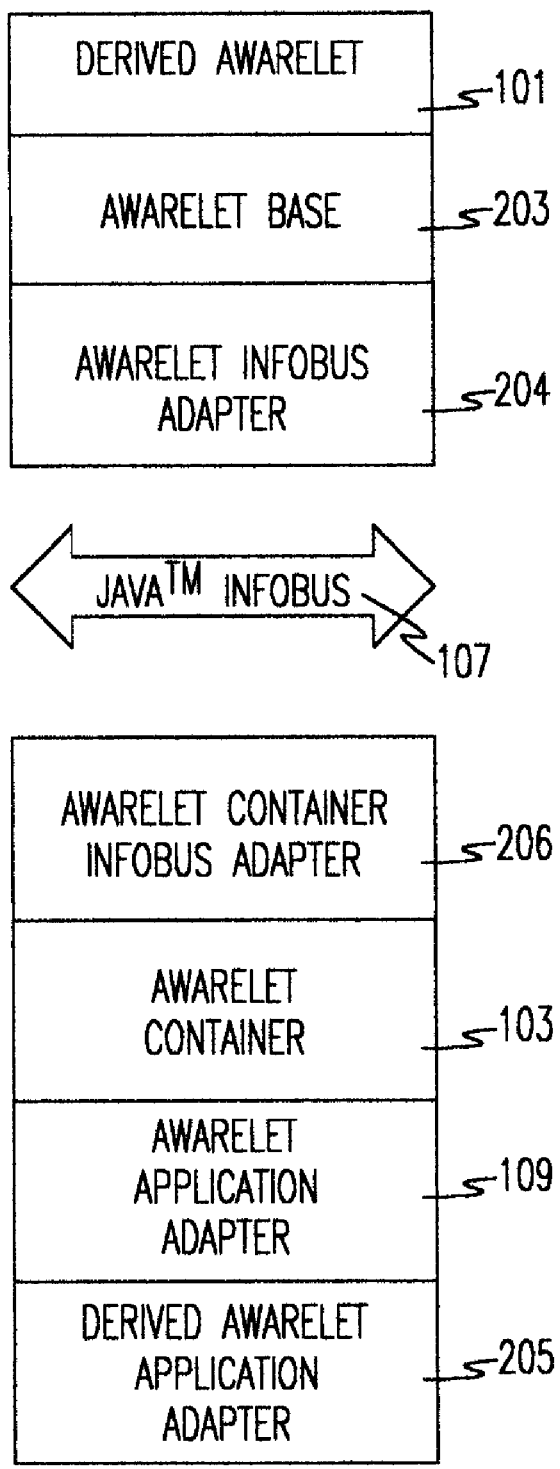
FIG. 2 illustrates the minimum necessary objects to be created in implementation of Awarelets for an online community application.

FIG. 2 is a high level diagram that indicates how a developer would derive a new Awarelet from a provided Awarelet Base class, and how the developer would incorporate an Awarelet container into the developer's own application.

Referring now to FIG. 2, a developer would be required to derive a new derived Awarelet 101 from the Awarelet base class 203, as available in the Awarelet framework, in order to implement the behavior of the derived Awarelet 101. An Awarelet implements behavior. A derived Awarelet must be developed which can handle the desired events and react, if necessary, in a desired fashion. The Awarelet InfoBus Adapter 204 is the interface used to communicate Awarelet events to and from the derived Awarelet 101 via the Java™ InfoBus 107.

The Awarelet Container InfoBus Adapter 206 is the element of the Awarelet framework which communicates developer created derived application information to and from the Awarelet Container, already a part of the Awarelet infrastructure. The developer may choose to create a derived application adapter 205 to facilitate proprietary event distribution within an application. The Awarelet Application Adapter 109 is a base class implemented in the Awarelet infrastructure for communicating with Awareness engines or event servers, either proprietary or Commercial-off-the-shelf (COTS) based (e.g. AOL instant messaging, Lotus® Sametime, Microsoft® MSN Messenger, ICQ, etc.). For each application, a developer will derive a customized derived Awarelet Application Adapter from the base class Awarelet Application Adapter.

Figure 3:
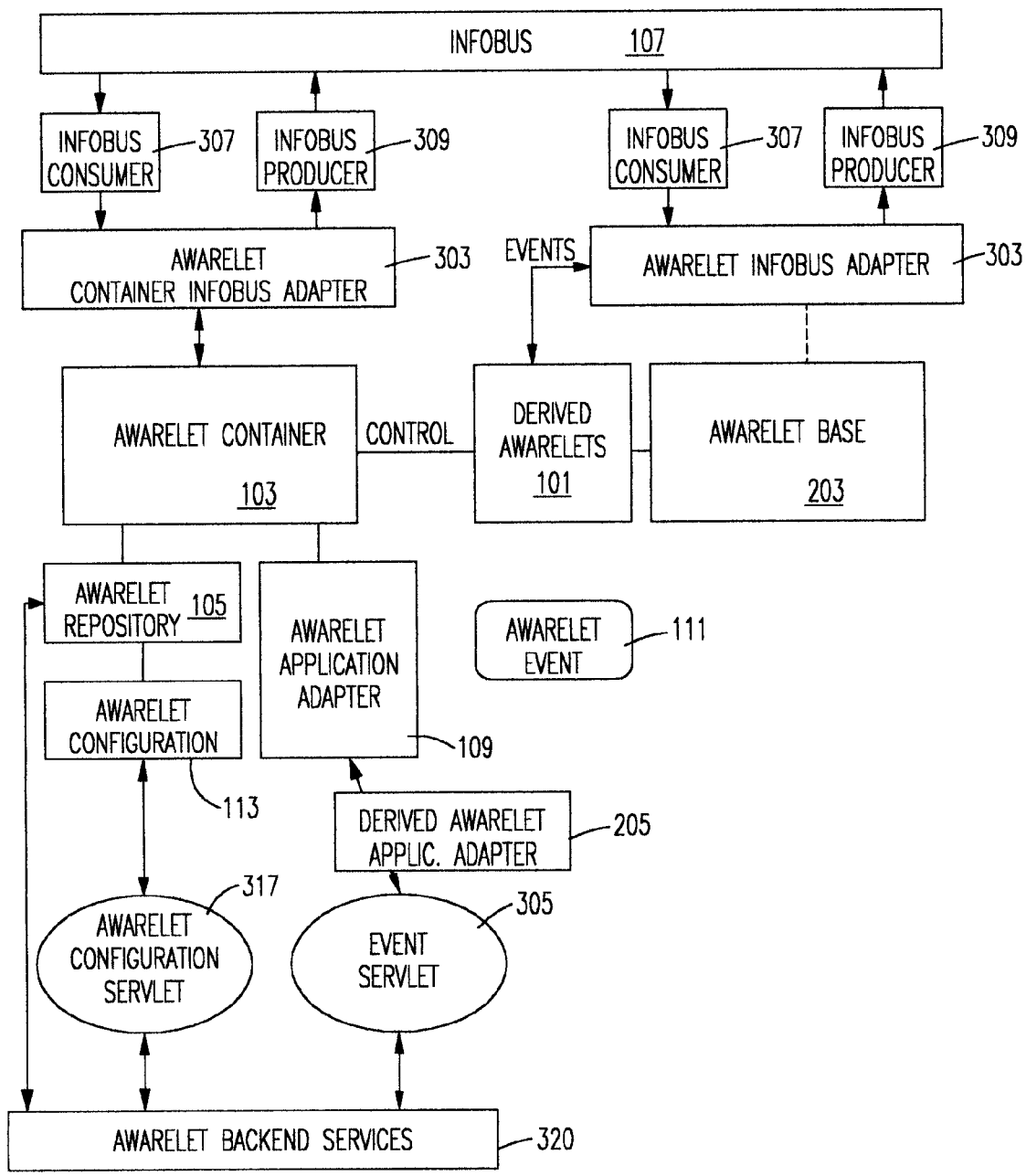
FIG. 3 illustrates the high level framework architecture according to the invention.

Referring now to FIG. 3, a derived Awarelet 101 is designed by deriving from the Awarelet Base class 203. The implementation of the framework provides the Awarelet Base class 203, which can be used by the developers to derive specific derived Awarelets 101. The Awarelet InfoBus Adapter 303 provides the connectivity to the InfoBus 107 via InfoBus consumer 307 (receive/read) and InfoBus producer 309 (send/write) and shields the developer from the programming complexity of the Java™ InfoBus. The developer must also implement methods to push or pull an Awarelet Event 111. It would be apparent to one skilled in the art how to implement these methods.

The Awarelet Container 103 will use the Awarelet Repository 105 to dynamically load the derived Awarelets 101 based on the Awarelet Configuration 113.

The Awarelet Container InfoBus Adapter 303 provides the connectivity to the InfoBus 107 via InfoBus consumer 307 (receive/read) and InfoBus producer 309 (send/write) and shields the developer from the programming complexity.

The Awarelet Container 103 receives and sends the Awarelet Events 111 on behalf of the derived Awarelets 101 and is independent of the communication mechanism used.

The Awarelet Container 103 makes use of an XML parser to extract the event data and build the Awarelet Event 111. This parser could be built-in or pre-existing.

An Awarelet Application Adapter 109 provides the features necessary for bidirectional interaction with the Awarelet Container 103. An application developer extends these features in order to interact with the derived Awarelets 101 in the Awarelet Container 103. Different communication mechanisms like CORBA (Common Object Request Broker Architecture), HTTP (hyper text transfer protocol), Awareness Engines, and event servers, etc. can be used to push and pull the Awarelet Events 101 and the Awarelet Application Adapter 109 will encapsulate a default set of communication mechanisms, like HTTP and Lotus® Sametime. An Event Servlet 305 is provided by the framework in order to allow for HTTP based events to be distributed to the members of the online community in the absence of an Awareness Engine like Lotus® Sametime. The Event Servlet 305 coordinates the subscriptions and events distribution to the members of the online community. Additional communication mechanisms can be added by application developers to extend the behavior of the Awarelet Application Adapter 109. The preferred embodiment of the present invention makes use of HTTP and the Event Servlet 305 acts as the conduit for the events. The Event Servlet 305 uses subscriptions as defined by the configuration data (in the Awarelet Configuration 113, as described below) which describes the various interests in events by the various derived Awarelets.

The Awarelet Event 111 typically consists of a message type and the XML message, or body. The message type is used to distinguish different events. The Awarelet Container 103 parses the Awarelet Event 111 and puts the appropriate data object onto the InfoBus 107 for the derived Awarelet 101 to handle. Similarly the Awarelet Container 103 can extract data from the InfoBus 107 and deliver the event to the Awarelet Application Adapter 109, which in turn will transport the event using the underlying communication mechanism.

Awarelet Configuration 113 will orchestrate the dynamic loading of derived Awarelets 101 inside the Awarelet Container 103. It will get and set configuration data for derived Awarelets 101 in terms of User, Role and Place. The preferred embodiment uses the Awarelet Configuration Servlet 317 to store and serve the configuration information. Each derived Awarelet 101 can have specific subscriptions for specific events. These subscriptions are part of the configuration data, and are used when derived Awarelets 101 are loaded into an Awarelet Container 103. After a derived Awarelet 101 is loaded, the Event Servlet 305 will use these subscriptions to extract and deliver only the relevant events to the derived Awarelets 101.

The Awarelet Repository 105 will provide storage for the derived Awarelets 101, and will use a built-in Class Loader (not shown) and the Awarelet Configuration 113 to provide the dynamic loading of the classes. The InfoBus Consumer 307 extracts Awarelet Events 111 from the InfoBus 107 and gives them to the Awarelet Container 103 via the Awarelet Container InfoBus Adapter 303. The InfoBus Producer 309 produces and puts Awarelet Events 111 onto the InfoBus 107.

Awarelet Backend services 320 provide access to, and management of, derived Awarelets 101 from the backend Awarelet Repository, as well as access to, and management of, configuration data for the derived Awarelets from the backend Awarelet Configuration. In addition, the Awarelet backend services 320 also provides integration and connectivity into basic event servers.

Figure 3A:
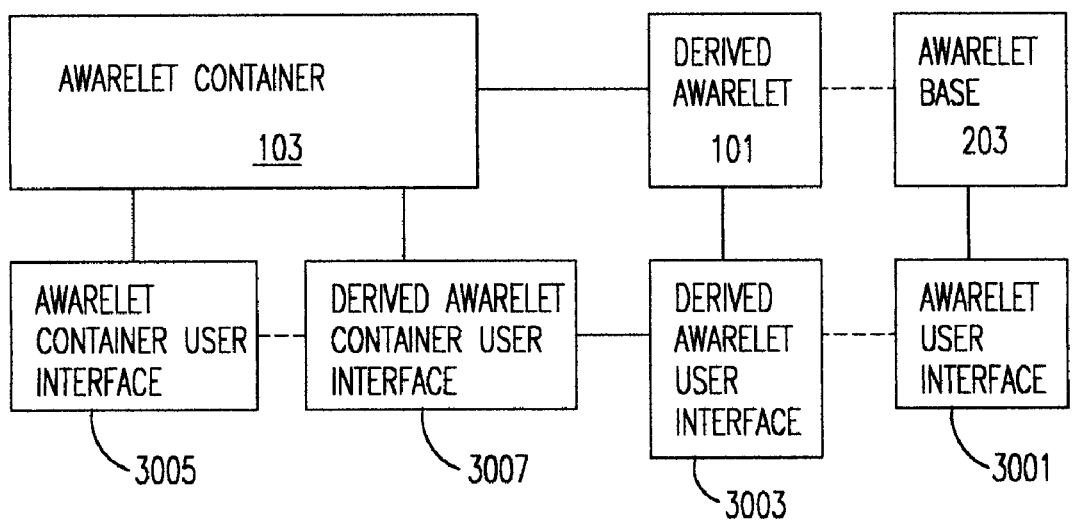
FIG. 3A illustrates the user interface aspects of the Awarelet framework, as depicted in FIG. 3.

This Awarelet framework provides user interface support for both derived Awarelets and for Awarelet Containers. Referring now to FIG. 3A, an Awarelet User Interface 3001 provides very basic support to render Awarelet Events. This support is limited, and typically an Awarelet developer will derive a Derived Awarelet User Interface 3003 in order to provide customized renderings for a Derived Awarelet 101. These renderings will typically show a user interface which depicts behavioral aspects of the derived Awarelet as well as informational aspects of the Awarelet events processed through the collaboration community which are defined by the context of this behavior.

Similarly an Awarelet Container User Interface 3005 provides basic support to render and organize derived Awarelets 101. The application developer can derive a derived Awarelet Container User Interface 3007 which can provide a customized organizational rendering of the derived Awarelets.

Figure 4A:
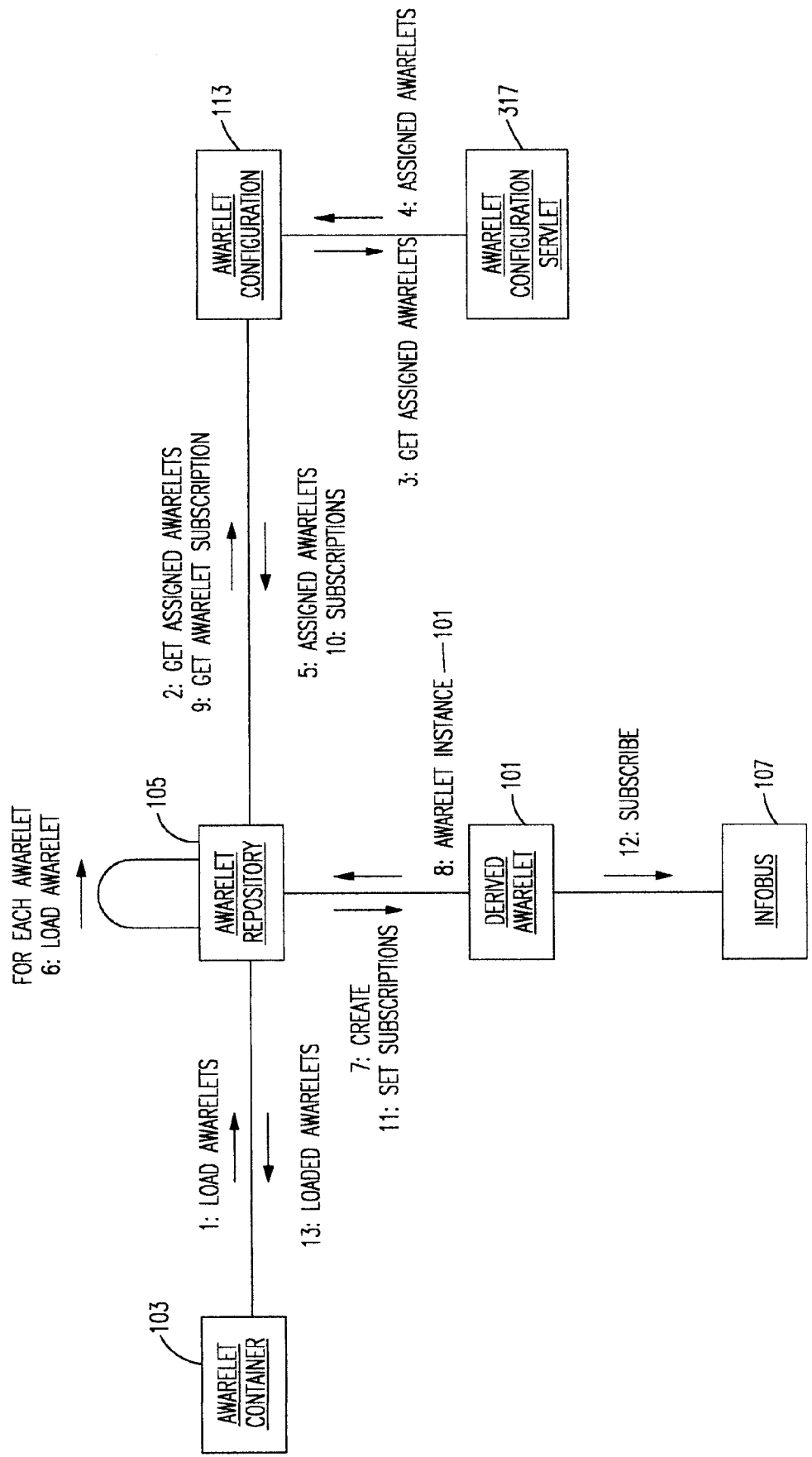
FIGS. 4A, 4B and 4C show interaction diagrams, specifically.

Referring now to FIG. 4A, there is shown the mechanism of loading of Awarelet instances, or derived Awarelets 101. The Awarelet Container 103 loads the Awarelets according to the following process. First, the Awarelet Repository 105 is tasked with getting Assigned Awarelets from the Awarelet Configuration 113. The Awarelet Configuration 113 gets the Assigned Awarelets from the Awarelet Configuration Servlet 317 and sends the information back to the Awarelet Repository 105. Then, for each returned Awarelet, the Awarelet Repository 105 loads the Awarelets and creates instances of the derived Awarelets 101. Based on subscriptions corresponding the Awarelet, as defined in the Awarelet Configuration 113, the Awarelet subscribes to the desired community by sending the subscription to the Information bus 107. The loaded, and now subscribed, Awarelet is stored in the Awarelet Container to handle events which may now be received from the Information bus 107.

The subscriptions used in the Awarelet Technology allow for a Derived Awarelet to express interest in Awarelet Events which they wish to receive, as well as declare which Awarelet Events will be emitted from the Derived Awarelet. After a Derived Awarelet is loaded into the Awarelet Container, the Awarelet Container will retrieve not only the subscribed Awarelet Events from the Awarelet Repository for the Derived Awarelet, but in addition, retrieve the description of the Awarelet Events which the Derived Awarelet will emit. These descriptions of emitted Awarelet Events will be used by the Awarelet Container in order for the Awarelet Container to subscribe to the InfoBus and consume emitted Derived Awarelet Events. After the emitted events are consumed by the Awarelet Container, the Derived Awarelet Application Adapter will be used to send the emitted events back down to an event server or Awareness engine.

Figure 4B:
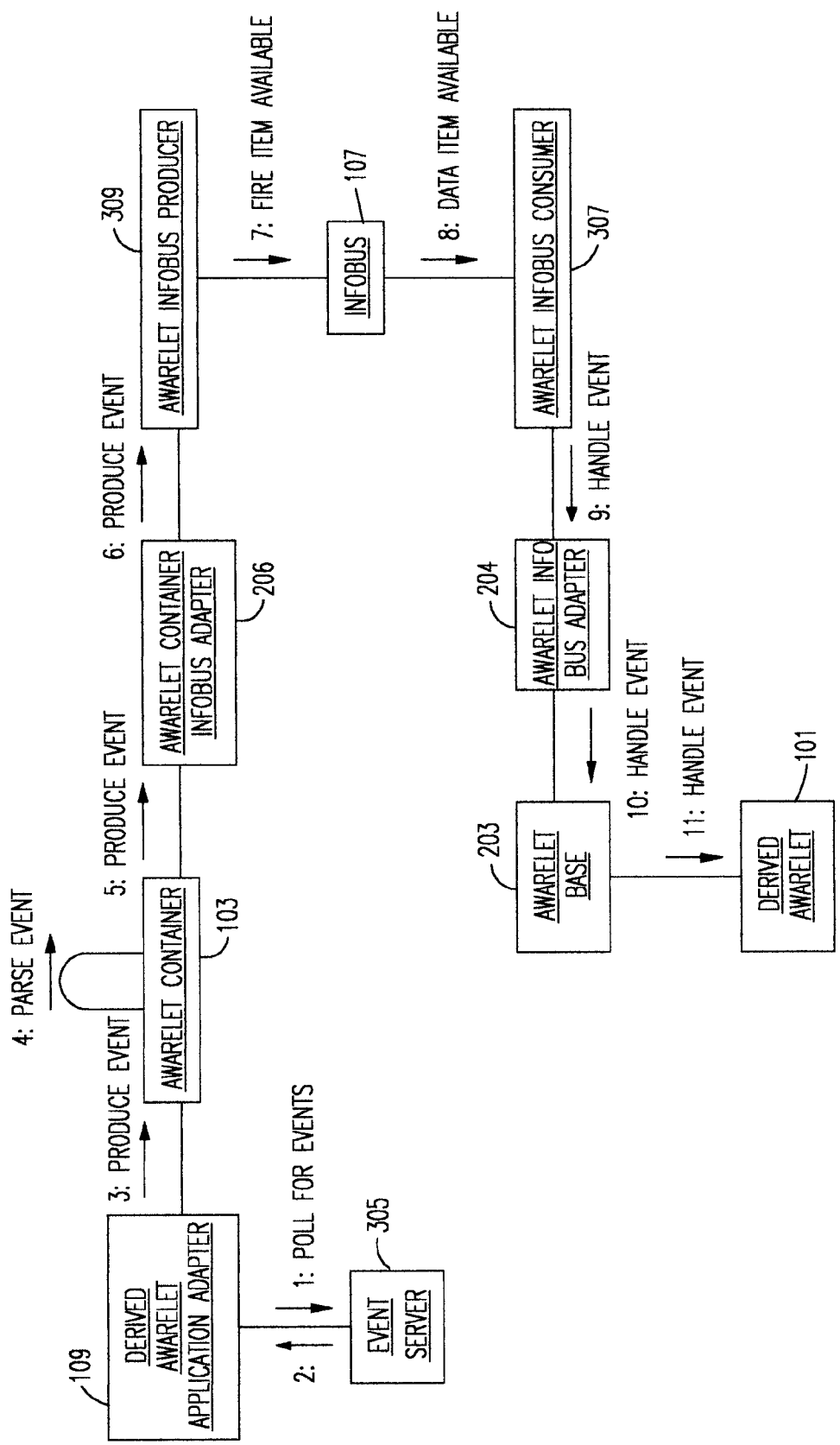

Referring now to FIG. 4B, there is shown the flow of Awarelet Event from the Awarelet Application Adapter 109 to the derived Awarelet 101. The Awarelet Application Adapter 109 polls for events of interest from the Event Servlet 305 and forwards events to the Awarelet Container 103. For each event, the Awarelet Container 103 parses the event, builds the data object and passes it to the Awarelet Container InfoBus Adapter 206. The Awarelet Container InfoBus Adapter 206 invokes the Awarelet InfoBus Producer 309 which puts the data object onto the InfoBus 107. The InfoBus 107 informs the Awarelet InfoBus Consumer 307, which has registered interest (by name) in this particular event data object. The Awarelet InfoBus Consumer 307 passes on the object to the Awarelet InfoBus Adapter 204, which finally transmits the event data object to the desired derived Awarelet 101, which processes the event according to its predefined methods, and may visually render it. The Awarelet Base 203 is shown here for illustrative purposes only. The derived Awarelet 101 is an instantiated object which inherits all methods from the parent Awarelet from the Awarelet Base 203. The derived Awarelet actually processes the Awarelet event received from the InfoBus 107.

Figure 4C:
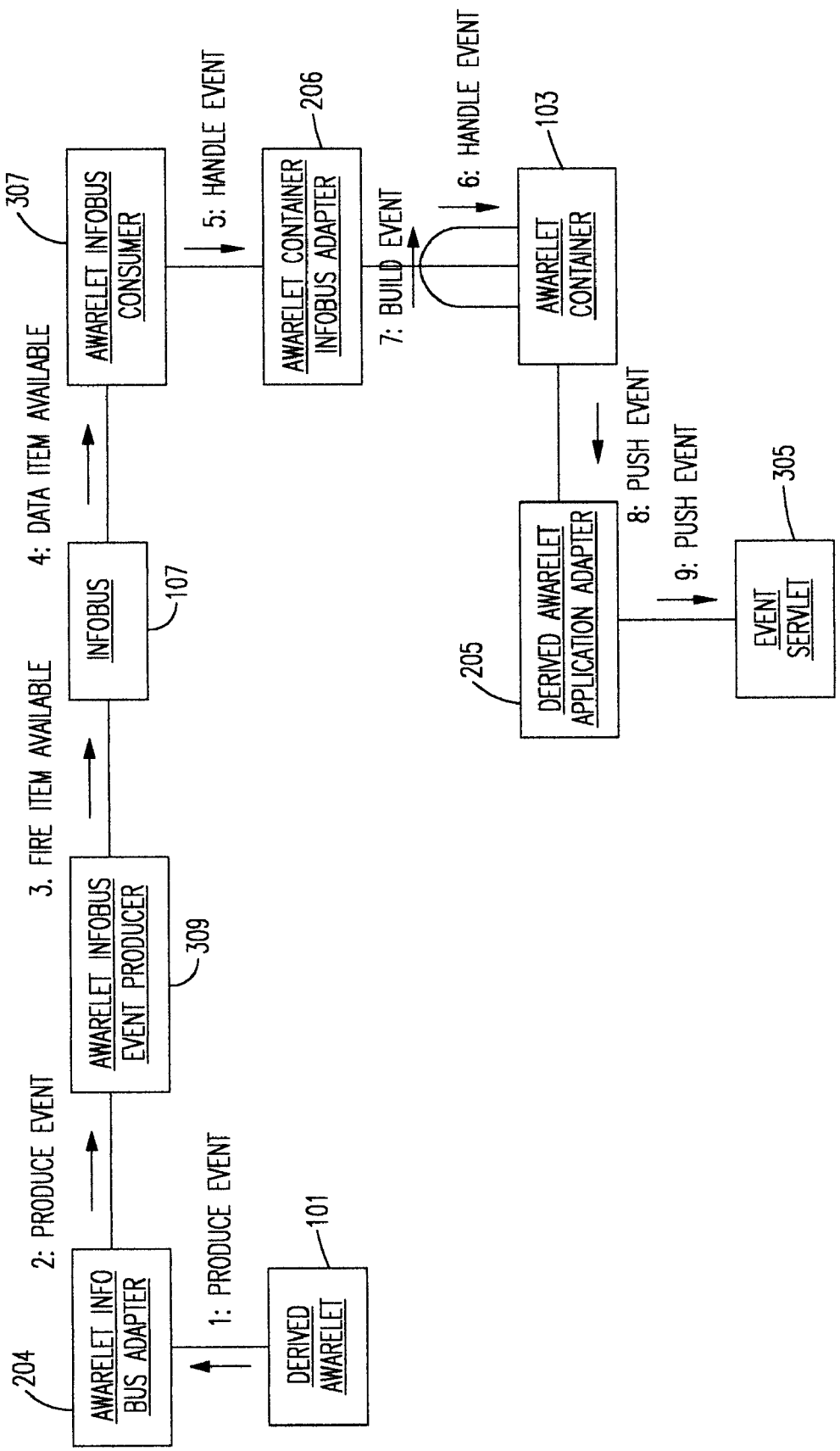

FIG. 4C illustrates the flow of Awarelet Event from the Awarelet to the Awarelet Application Adapter 109. The derived Awarelet 101 constructs the event data object and forwards it to the Awarelet InfoBus Adapter 204. The Awarelet InfoBus Adapter 204 forwards the request to the Awarelet InfoBus Producer 309 which puts the data onto the InfoBus 107. The InfoBus 107 informs the Awarelet InfoBus Consumer 307, which has registered interest (by name) in this particular data object. The Awarelet InfoBus Consumer 307 passes on the object to the Awarelet Container InfoBus Adapter 206 which forwards it to the Awarelet Container 103. The Awarelet Container 103 builds the XML (or Java™ object) event and invokes the Awarelet Application Adapter 109 to transmit it through the event conduit, in this case the Event Servlet 305.

The Awarelet base class is a class provided in the Awarelet framework which developers will use as a basis for building Awarelets exhibiting desired behaviors dependent on the desired application.

The present invention is an advantage over the prior art because it provides a framework which supports a programming model to distribute and deploy Awarelets dynamically to end users in an online community. This same programming model allows for the creation of Awarelets which subscribe, process and render complex messages to end users in an online community, whereas in the prior art, users are only able to send/receive simple text messages.

Another advantage of the present invention is that because of this ability to send complex messages, business related collaborations are supported where users, applications and business processes are all able to interact and work together. The present invention allows more than just users to participate in the online community. For instance, a machine process or software process might react to selected event by automatically creating an Awarelet event in a subscribed collaboration environment. This event could be handled by sending an e-mail, facsimile, or electronic communication to another member of the online community. It is not necessary that the member be a human user. When an online collaboration community is designed, the appropriate behaviors for the derived Awarelets would be defined. When the derived Awarelets are then implemented and deployed to a user, the Awarelet events are handled as appropriate.

While the invention has been described in terms of its preferred embodiments, those skilled in the art will recognize that the invention can be practiced with modification within the spirit and scope of the appended claims.

Having thus described our invention, what we claim as new and desire to secure by Letters Patent is as follows:

1. A computer implemented framework supporting a programming model to provide, distribute and deploy event handlers (awarelets) dynamically to end users in an online community, comprising:

at least one generic awarelet (awarelet base) for providing a basis for customization of awarelets, the customized awarelets having the ability to process and receive events;

an awarelet container for hosting customized awarelets, the awarelet container being used by an application or system for managing an online community where the management of the online community needs to process events, wherein the awarelet container shields customized awarelets from an underlying communication mechanism by pushing and pulling awarelet events from an information bus;

a generic awarelet application adapter providing a basis for customized awarelet application adapters which are integrated with the awarelet container for sending and receiving awarelet events over the underlying communication mechanism, wherein the customized awarelet application adapter serves as a bi-directional communication bridge between the awarelet container and the underlying communication mechanism thereby allowing awarelets to be focused on event handling and not be burdened with communication details;

means for constructing at least one awarelet event comprising an event type and event body; and an awarelet repository providing means for storing the customized awarelets and awarelet configuration data, the awarelet repository comprising means for dynamically loading awarelets based on the stored awarelet configuration.

2. A computer implemented framework as recited in claim 1, further comprising at least one user customized awarelet for processing received events.

3. A computer implemented framework as recited in claim 1, further comprising at least one user customized awarelet application adapter for sending and receiving awarelet events over the underlying communication mechanism.

4. A computer implemented framework as recited in claim 1, wherein the awarelet event body has features which are not simple text.

5. A computer implemented framework as recited in claim 1, wherein the Awarelets render a received event visually when processing the received events.

6. A computer implemented framework as recited in claim 1, wherein the Awarelet Application Adapter communicated Awarelet Events to client applications via one of a standard framework and proprietary framework of online communities.

7. A computer implemented framework as recited in claim 1, wherein the collaboration takes place in real-time.

8. A computer implemented framework as recited in claim 1, further comprising means for customizing a user interface for rendering a customized awarelet, thereby allowing a user to interact with the customized awarelet.

9. A computer implemented framework as recited in claim 1, further comprising means for customizing a user interface for rendering the awarelet container, thereby allowing a user to customize a presentation of awarelets in the awarelet container.

10. A method for event handling using "awarelets", said method comprising the steps of:

initializing an awarelet container for hosting at least one event handler (awarelet), the awarelet container being used by an application that needs to process events, wherein the awarelet container shields awarelets from an underlying communication mechanism by pushing and pulling awarelet events from an information bus;

defining configuration data for awarelets, the configuration data being stored in an awarelet repository;

receiving configuration data by the awarelet container from the awarelet repository, the awarelet repository providing means for storing awarelets and corresponding awarelet configurations, the awarelet repository comprising means for dynamically loading awarelets based on the stored awarelet configuration;

generating at least one awarelet by deriving class information from an awarelet base class;

generating an awarelet application adapter by deriving class information from an awarelet application adapter base class;

providing connectivity between an information bus and awarelet container, the awarelet container acting as a host for the at least one awarelet;

providing connectivity between the information bus and awarelet;

providing connectivity between an awarelet application adapter and the underlying communication mechanism, wherein the underlying communication mechanism connects to one of an awareness server and an event server;

receiving events from the underlying communication mechanism by the awarelet application adapter;

producing awarelet events by the awarelet application adapter and sending the produced awarelet events to the awarelet container;

producing awarelet events onto the information bus by the awarelet container;

extracting awarelet events from the information bus by at least one awarelet;

processing awarelet events by the at least one awarelet;

emitting awarelet events onto the information bus by the at least one awarelet;

extracting emitted awarelet events from the information bus by the awarelet container;

sending emitted awarelet events to the awarelet application adapter by the awarelet container;

sending events to the underlying communication mechanism by the awarelet application adapter, wherein the sent events are derived from the awarelet events received by the awarelet application adapter, wherein emitted awarelet events may be processed or extracted by more than one awarelet.

11. A method as recited in claim 10, wherein the configuration data comprises methods for handling and processing events, data defining user, role and place for the awarelet, and specific event subscription data.

12. A method as recited in claim 10, wherein awarelet events are extracted and processed by awarelets based on subscription by the awarelet to an event type.

* * * * *